United States Patent
Rho et al.

(10) Patent No.: US 12,019,711 B2
(45) Date of Patent: Jun. 25, 2024

(54) CLASSIFICATION SYSTEM AND METHOD BASED ON GENERATIVE ADVERSARIAL NETWORK

(71) Applicant: AGILESODA INC., Seoul (KR)

(72) Inventors: Cheol-Kyun Rho, Seoul (KR); Ye-Rin Min, Namyangju-si (KR); Pham-Tuyen Le, Suwon-si (KR)

(73) Assignee: AGILESODA INC., Seoul (KR)

( * ) Notice: Subject to any disclaimer, the term of this patent is extended or adjusted under 35 U.S.C. 154(b) by 372 days.

(21) Appl. No.: 17/606,517

(22) PCT Filed: Mar. 17, 2020

(86) PCT No.: PCT/KR2020/003622
§ 371 (c)(1),
(2) Date: Oct. 26, 2021

(87) PCT Pub. No.: WO2021/112335
PCT Pub. Date: Jun. 10, 2021

(65) Prior Publication Data
US 2022/0207300 A1    Jun. 30, 2022

(30) Foreign Application Priority Data

Dec. 6, 2019  (KR) .................. 10-2019-0023895
Dec. 6, 2019  (KR) .................. 10-2019-0162109
Dec. 6, 2019  (KR) .................. 10-2019-0162110
Dec. 6, 2019  (KR) .................. 10-2019-0162111
Dec. 6, 2019  (KR) .................. 10-2020-0023894

(51) Int. Cl.
G06F 18/00     (2023.01)
G06F 18/214    (2023.01)
G06N 3/045     (2023.01)

(52) U.S. Cl.
CPC ......... *G06F 18/2148* (2023.01); *G06N 3/045* (2023.01)

(58) Field of Classification Search
CPC .... G06F 18/2148; G06N 3/045; G06N 3/047; G06N 3/08
See application file for complete search history.

(56) References Cited

U.S. PATENT DOCUMENTS

2021/0073630 A1*   3/2021  Zhang ................ G06N 3/08

FOREIGN PATENT DOCUMENTS

| JP | 2006-251997 A    | 9/2006 |
|----|------------------|--------|
| KR | 10-2016-0084456 A | 7/2016 |
| KR | 10-2019-0096295 A | 8/2019 |

(Continued)

OTHER PUBLICATIONS

Pfau et al, Connecting generative adversarial networks and actor-critic methods, arXiv:1610.01945v3 (Year: 2017).*

(Continued)

*Primary Examiner* — Ping Y Hsieh
*Assistant Examiner* — Xiao Liu
(74) *Attorney, Agent, or Firm* — NSIP Law

(57) ABSTRACT

A generative adversarial network-based classification system and method that can generate missing data as missing data imputation values similar to real data using a generative adversarial network (GAN) and allowing training with labeled data sets with labels, as well as and irregular data sets such as non-labeled data sets without labels.

9 Claims, 13 Drawing Sheets

(56) References Cited

FOREIGN PATENT DOCUMENTS

KR  10-2019-0110068 A    9/2019
WO  WO-2019155052 A1 *  8/2019  ............ G06F 30/20

OTHER PUBLICATIONS

Barto et al, An Actor/Critic Algorithm that Equivalent to Q-Learning, NIPS (Year: 1994).*
Hwang et al, HexaGAN: Generative Adversarial Nets for Real World Classification, arXiv:1902.09913v2 May 27 (Year: 2019).*
Pfau, David et al., "Connecting Generative Adversarial Networks and Actor-Critic Methods," *arXiv preprint arXiv:1610.01945*, 2016 (pp. 1-9).
Henderson, Peter, et al., "OptionGAN: Learning Joint Reward-Policy Options using Generative Adversarial Inverse Reinforcement Learning," *Proceedings of the AAAI conference on artificial intelligence*, vol. 32, No. 1, 2018 (pp. 1-11).
Yoon, Jinsung, et al., "GAIN: Missing Data Imputation using Generative Adversarial Nets," *International Conference on Machine Learning. PMLR*, 2018 (pp. 1-10).
International Search Report issued on Aug. 26, 2020 in counterpart International Patent Application No. PCT/KR2020/003622 (3 pages in English and 3 pages in Korean).
Written Opinion issued on Aug. 26, 2020 in counterpart International Patent Application No. PCT/KR2020/003622 (5 pages in Korean).

* cited by examiner

FIG. 11
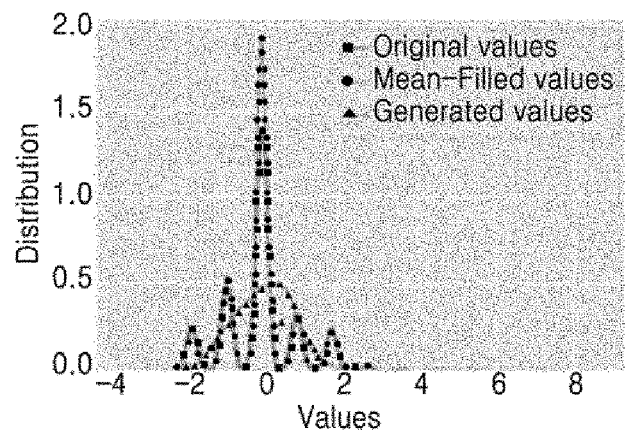
(a)
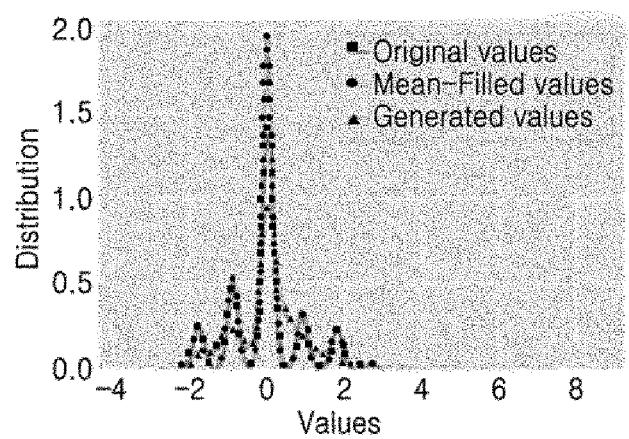
(b)
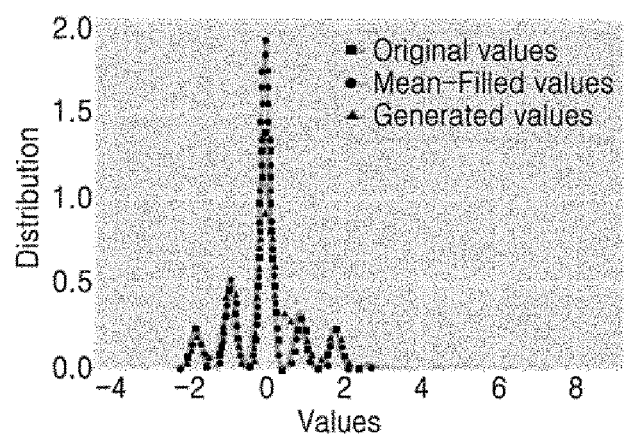
(c)

FIG. 12

| Method | Accuracy | Precision | Recall | F1 |
|---|---|---|---|---|
| Our w/o $G, D, W, R$ | $0.775 \pm 0.012$ | $0.491 \pm 0.026$ | $0.406 \pm 0.029$ | $0.443 \pm 0.015$ |
| Our w/o $W, R$ | $0.789 \pm 0.015$ | $0.532 \pm 0.039$ | $0.398 \pm 0.031$ | $0.453 \pm 0.013$ |
| Our w/o $R$ | $0.783 \pm 0.011$ | $0.510 \pm 0.021$ | $0.445 \pm 0.021$ | $0.474 \pm 0.010$ |
| Our ($\epsilon = 0.5$) | $0.795 \pm 0.008$ | $0.546 \pm 0.023$ | $0.418 \pm 0.015$ | $0.473 \pm 0.009$ |
| Our ($\epsilon = 0.9$) | $0.780 \pm 0.013$ | $0.503 \pm 0.027$ | $0.460 \pm 0.025$ | $0.479 \pm 0.011$ |
| GAIN+SMOTE+TripleGAN | - | - | - | $0.440 \pm 0.003$ |
| HexaGAN | - | - | - | $0.463 \pm 0.004$ |

FIG. 13
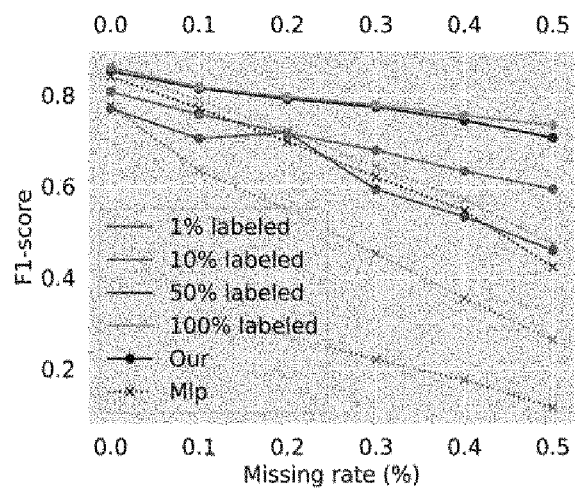
(a)
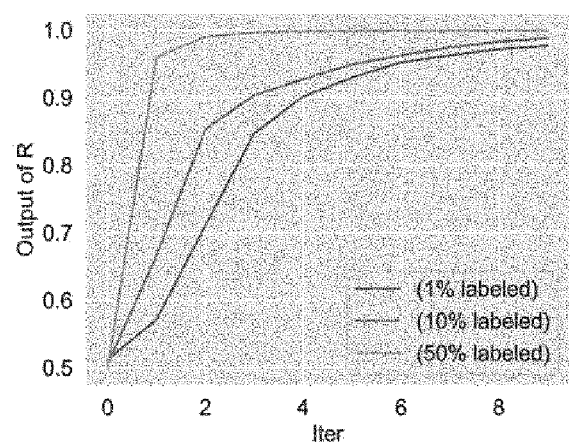
(b)

CLASSIFICATION SYSTEM AND METHOD BASED ON GENERATIVE ADVERSARIAL NETWORK

CROSS REFERENCE TO RELATED APPLICATIONS

This application is a U.S. National Stage Application of International Application No. PCT/KR2020/003622, filed on Mar. 17, 2020, which claims the benefit under 35 USC 119(a) and 365(b) of Korean Patent Application No. 10-2019-0162109, filed on Dec. 6, 2019, Korean Patent Application No. 10-2019-0162110, filed on Dec. 6, 2019, Korean Patent Application No. 10-2019-0162111, filed on Dec. 6, 2019, Korean Patent Application No. 10-2020-0023894, filed on Dec. 6, 2019, and Korean Patent Application No. 10-2020 0023895, filed on Dec. 6, 2019 in the Korean Intellectual Property Office, the entire disclosure of which is incorporated herein by reference for all purposes.

TECHNICAL FIELD

The present invention relates to a classification system and method based on a generative adversarial network, and more specifically, to a classification system and method based on a generative adversarial network, which may learn with a labeled dataset with labels and even with an imbalanced dataset of an unlabeled dataset without labels by using missing imputation values generated by a generative adversarial network (GAN).

BACKGROUND ART

Machine learning is an application of artificial intelligence that allows a complex system to automatically learn and improve from experience without being explicitly programmed.

Accuracy and effectiveness of machine learning models may partly depend on the data used to train the models.

For example, a machine learning classifier may be trained using datasets with labels (or labeled datasets), and here, samples of data that the classifiers will learn to recognize are provided to the classifier together with one or more labels for identifying classification of the samples.

Here, the labeled data means that an answer to the data is given (or evaluated).

However, decision-making systems occasionally suffer from the problems described below.

FIG. 1 is an exemplary view showing a dataset including general missing data. As shown in FIG. 1, a dataset 10 is configured to include n states, and an element 11 of a state is the 'j-th' element that state 'i' has and is expressed as '$S_i^j$', where 'j' is a constant between 1 and d, and '$S_i^j$' may have a scalar or missing data '$Z_i^j$' 12.

Since the missing data lowers the overall quality of the dataset, there is a problem in that a result predicted by a decision-making system is distorted.

In addition, although the amount of labeled data has a significant influence on performance in deep learning, since most real datasets generally include unlabeled data without labels, the cost of labeling the data is very high.

In addition, since a general business dataset for decision-making in a business has a problem of many missing values, i.e., unideal label imbalance, there are many difficulties in constructing a classification system.

In addition, although a general business dataset for decision-making in a business has a problem in that difference in imbalance is very severe and a small number of classes occupy only a very small portion of data, as a result, samples of the classes are almost not queried in the process of updating the decision-making system.

In addition, in the case of a general business dataset for decision-making in a business, e.g., a dataset of a loan fraud business, there is a problem in that it is difficult to classify and predict with a conventional classification system since the fraud case is very trivial.

DISCLOSURE OF INVENTION

Technical Problem

Therefore, the present invention has been made in view of the above problems, and it is an object of the present invention to provide a classification system and method based on a generative adversarial network, which may learn with a labeled dataset with labels and even with an imbalanced dataset of an unlabeled dataset without labels by using missing imputation values generated by a generative adversarial network (GAN).

Technical Solution

To accomplish the above object, according to one aspect of the present invention, there is provided a classification system based on a generative adversarial network, the system comprising: a generator for generating a missing imputation value for a missing part among states from a labeled dataset; a discriminator for discriminating the missing imputation value generated by the generator from original data; an actor for predicting an action through a policy with the missing imputation value generated by the generator; and a weighted function unit for generating a weight value of a reward on the basis of a state replaced with the missing imputation value, the predicted action, and a label of the labeled dataset.

The weighted function unit operates to balance labels by increasing the weight value of the reward for a label having a relatively low frequency and decreasing the weight of the reward for a label having a relatively high frequency.

The actor learns the policy to optimize a policy loss function by reflecting the predicted action and the weight value of the reward generated by the weighted function unit.

In addition, the weight value of the reward according to an embodiment of the present invention is defined by the following equation.

$$W(\hat{s}, a, y) = r(\hat{s}) * \begin{cases} \omega_y, & y = a, \text{right prediction} \\ \dfrac{\omega_y + \omega_a}{2}, & y \neq a, \text{wrong prediction} \end{cases}$$

Here, $r(\hat{s})$ is a reward that can be taken from state $\hat{s}$, a is an action predicted by policy $\pi$ for a given state, y is a label of a state, and $\omega_y$ and $\omega_a$ are weight coefficients based on $\omega_k = 1 - \log_b \varphi_k$ (b is e based on logarithm, 10 . . . ).

In addition, the weighted function unit according to an embodiment of the present invention operates to balance labels by increasing the weight value of the reward for a label having a relatively low frequency and decreasing the weight of the reward for a label having a relatively high frequency.

In addition, the label frequency according to an embodiment of the present invention is approximated as shown in the equation below.

$$\varphi_k = \frac{n_k}{\sum_{k=0}^{k-1} n_k}$$

Here, $n_k$ is the number of samples of the k-th label, and $\varphi_k$ is within a range of (0, 1), and the actor learns the policy to optimize the policy loss function 41 by reflecting the predicted action and the weight value of the reward generated by the weighted function unit.

In addition, the weighted function unit according to an embodiment of the present invention operates to balance labels by increasing the weight value of the reward for a label having a relatively low frequency and decreasing the weight of the reward for a label having a relatively high frequency.

In addition, the actor according to an embodiment of the present invention learns the policy to optimize a policy loss function by reflecting the predicted action and the weight value of the reward generated by the weighted function unit.

In addition, learning the policy according to an embodiment of the present invention uses the equation shown below.

$$L_L = \begin{cases} -\mathbb{E}[[y\log\pi(\hat{s}) + (1-y)\log(1-\pi(\hat{s}))] * W(\hat{s}, a, y)], & \text{binomial} \\ -\mathbb{E}\left[\sum_{y=0,1...} y^y \log \pi^y(\hat{s}) * W(\hat{s}, a, y)\right], & \text{categorial} \end{cases}$$

Here, y is a label of a state, a is an action predicted by policy π for a given state, and W(ŝ, a, y) is a weight value of a reward for the state, action, and label.

In addition, according to another aspect of the present invention, there is provided a generative adversarial network-based classification method using a classification system based on a generative adversarial network (GAN) configured of a generator, a discriminator, an actor, and a weighted function unit, the method comprising the steps of: a) generating a missing imputation value for a missing part among states from a labeled dataset, by the generator; b) predicting an action through a policy with the missing imputation value generated by the generator, by the actor; c) generating a weight value of a reward on the basis of a state replaced with the missing imputation value, the predicted action, and a label of the labeled dataset, by the weighted function unit; and d) learning the policy to optimize a policy loss function by reflecting the predicted action and the weight value of the reward generated by the weighted function unit, by the actor.

Here, at step c), the weighted function unit operates to balance labels by increasing the weight value of the reward for a label having a relatively low frequency and decreasing the weight of the reward for a label having a relatively high frequency.

In addition, step a) according to an embodiment of the present invention further includes: i) a step of selecting a state having a missing value from the labeled dataset, and a missing indicator (m) indicating whether a state element corresponding to the state is missing, by the generator; and ii) a preprocessing step of generating a missing imputation value ŝ using a missing imputation value s̃ obtained by replacing the state with random noise randomly selected from a uniform distribution between '0' and '1', and learning the generator and the discriminator using the generated missing imputation value Ŝ.

In addition, the weighted function unit of step c) according to an embodiment of the present invention operates to balance labels by increasing the weight value of the reward for a label having a relatively low frequency and decreasing the weight of the reward for a label having a relatively high frequency.

In addition, the label frequency according to an embodiment of the present invention is approximated as shown in the equation below.

$$\varphi_k = \frac{n_k}{\sum_{k=0}^{k-1} n_k}$$

Here, $n_k$ is the number of samples of the k-th label, and $\varphi_k$ is within a range of (0, 1).

In addition, the weight value of the reward according to an embodiment of the present invention is defined by the following equation.

$$W(\hat{s}, a, y) = r(\hat{s}) * \begin{cases} \omega_y, & y = a, \text{ right prediction} \\ \dfrac{\omega_y + \omega_a}{2}, & y \neq a, \text{ wrong prediction} \end{cases}$$

Here, r(ŝ) is a reward that can be taken from state ŝ, a is an action predicted by policy π for a given state, y is a label of a state, and $\omega_y$ and $\omega_a$ are weight coefficients based on $\omega_k = 1 - \log_b \varphi_k$ (b is e based on logarithm, 10 . . . ).

In addition, the weighted function unit of step c) according to an embodiment of the present invention operates to balance labels by increasing the weight value of the reward for a label having a relatively low frequency and decreasing the weight of the reward for a label having a relatively high frequency.

In addition, at step d) according to an embodiment of the present invention, learning the policy is performed using the equation shown below.

$$L_L = \begin{cases} -\mathbb{E}[[y\log\pi(\hat{s}) + (1-y)\log(1-\pi(\hat{s}))] * W(\hat{s}, a, y)], & \text{binomial} \\ -\mathbb{E}\left[\sum_{y=0,1...} y^y \log \pi^y(\hat{s}) * W(\hat{s}, a, y)\right], & \text{categorial} \end{cases}$$

Here, y is a label of a state, a is an action predicted by policy π for a given state, and W(ŝ, a, y) is a weight value of a reward for the state, action, and label.

In addition, according to another aspect of the present invention, there is provided a classification system based on a generative adversarial network, the system comprising: a generator for generating a missing imputation value for a missing part among states from a labeled dataset $S_L$ or an unlabeled dataset $S_U$; a discriminator for discriminating the missing imputation value generated by the generator from original data; an actor for predicting an action through a policy with the missing imputation value generated by the generator; a weighted function unit for generating a weight value of a reward on the basis of a state replaced with the missing imputation value, the predicted action, and a label of the labeled dataset; and a reward unit for providing a reward so that the policy of the actor is learned targeting the labeled dataset and the unlabeled dataset.

Here, the actor learns the policy to optimize a policy loss function by reflecting the predicted action and the weight value of the reward generated by the weighted function unit, and learns the policy to optimize a semi-supervised policy loss function on the basis of the predicted action and the reward of the reward unit.

In addition, the reward of the reward unit 600a according to an embodiment of the present invention is defined as shown in the following equation.

$$r(\hat{s}_u, a) = \begin{cases} 1, & R(\hat{s}_L, a) \geq \varepsilon \\ 0, & \text{otherwise} \end{cases}$$

Here, $R(\hat{s}_L, a)$ is the probability of whether the labeled dataset $(\hat{S}, a)$ pair output from the reward unit is a label of a labeled dataset with labels or a label generated by the actor, and $\varepsilon \in [0, 1]$ is a threshold value considering whether a state-action pair is likely to be included in a labeled dataset.

In addition, according to another aspect of the present invention, there is provided a generative adversarial network-based classification method using a generative adversarial network (GAN) configured of a generator, a discriminator, an actor, a weighted function unit, and a reward unit, the method comprising the steps of: a) generating a missing imputation value for a missing part among states from a labeled dataset $S_L$, by the generator; b) predicting an action through a policy with the missing imputation value generated by the generator, by the actor; c) generating a weight value of a reward on the basis of a state replaced with the missing imputation value, the predicted action, and a label of the labeled dataset, by the weighted function unit; and d) learning the policy to optimize a policy loss function by reflecting the predicted action and the weight value of the reward generated by the weighted function unit, by the actor.

Here, when there is an unlabeled dataset $(S_U)$ at step a), the method further comprises the steps of: a-1) generating a missing imputation value $\hat{s}_U$ for a missing part among states from an unlabeled dataset $S_U$, by the generator; b-1) predicting an action through a policy with the generated missing imputation value $\hat{s}_U$, by the actor 40a; and c-1) providing a reward so that the policy of the actor is learned targeting the labeled dataset and the unlabeled dataset, by the reward unit; and d-1) learning the policy to optimize a semi-supervised policy loss function on the basis of the predicted action and the reward of the reward unit.

In addition, the reward of the reward unit 600a according to an embodiment of the present invention is defined as shown in the following equation.

$$r(\hat{s}_u, a) = \begin{cases} 1, & R(\hat{s}_L, a) \geq \varepsilon \\ 0, & \text{otherwise} \end{cases}$$

$R(\hat{s}_L, a)$ is the probability of whether the labeled dataset $(\hat{S}, a)$ pair output from the reward unit is a label of a labeled dataset with labels or a label generated by the actor, and $\varepsilon \in [0, 1]$ is a threshold value considering whether a state-action pair is likely to be included in a labeled dataset.

Advantageous Effects

The present invention has an advantage of automatically providing a reward function system according to the characteristics of data in order to dramatically reduce the time and the trial-and-error process required for setting a reward function for developing an optimal model of reinforcement learning, by combining an 'actor-critic' architecture and a generative adversarial network (GAN) architecture in the reinforcement learning.

In addition, the present invention has an advantage of improving the overall quality of data since missing data generated using a generative adversarial network (GAN).

In addition, the present invention has an advantage of reducing negative effects of missing data.

The present invention has an advantage of learning with a labeled dataset with labels and even with an imbalanced dataset such as an unlabeled dataset without labels, using the missing data generated by the generative adversarial network (GAN).

In addition, the present invention has an advantage of simultaneously using a labeled dataset and an unlabeled dataset as input data, and learning with a small number of datasets.

In addition, the present invention has an advantage of reducing the time of constructing a classification system and method by providing a customized reward function related to the imbalance ratio of labels.

In addition, in applying a reinforcement learning methodology for the problem of optimizing business decision-making in a financial institution such as a bank, a card or insurance company or the like or in a system, manufacturing, or airline company, the present invention has an advantage in that the reinforcement learning methodology can be applied without a design for missing imputation in a dataset or a design for applying a reward function.

In addition, according to the present invention, there is an advantage in that a reinforcement learning methodology can be applied while reducing the cost and time when a general analyst constructs a classification system, as the problems of many missing values, i.e., unideal label imbalance, that may occur in a general business dataset for decision-making in a business can be solved.

In addition, according to the present invention, in the case of a general business dataset for decision-making in a business, e.g., a dataset of a loan fraud business, although the fraud case is very trivial, there is an advantage of constructing a system that may further focus on the fraud case, by increasing the reward value for the fraud case to be relatively high through weight value adjustment using a weighted function.

BRIEF DESCRIPTION OF THE DRAWINGS

FIG. 11 is a graph showing distribution of values generated during a learning process by utilizing a classification system based on a generative adversarial network using labeled data and unlabeled data according to an embodiment of the present invention.

FIG. 12 is an exemplary view showing performance with and without a plug-in element by utilizing a classification system based on a generative adversarial network using labeled data and unlabeled data according to an embodiment of the present invention.

FIG. 13 is a graph showing performance comparison according to a labeled data ratio and a missing rate by utilizing a classification system based on a generative adversarial network using labeled data and unlabeled data according to an embodiment of the present invention.

BEST MODE FOR CARRYING OUT THE INVENTION

Hereinafter, a preferred embodiment of a classification system and method based on a generative adversarial network using labeled data according to an embodiment of the present invention will be described in detail with reference to the accompanying drawings.

In this specification, the expression that a part "includes" a certain component does not exclude other components, but means that other components may be further included.

In addition, terms such as " . . . unit", " . . . group", " . . . module" and the like mean a unit that processes at least one function or operation, and this may be divided into hardware, software, or a combination of the two.

In addition, throughout the detailed description and claims of the present invention, 'learning' is a term referring to performing machine learning through procedural computing in a computer system, and is not intended to refer to mental actions such as educational activities of human, and training is used as a meaning that is generally accepted with regard to machine learning.

In addition, a computing device may include a communication device and a processor, and may directly or indirectly communicate with external computing devices through the communication device.

Specifically, the computing device may be a device that achieves desired system performance using a combination of typical computer hardware (e.g., devices that may include computer processors, memory, storages, input and output devices, and other components of existing computing devices; electronic communication devices such as routers, switches, and the like; electronic information storage systems such as network-attached storages (NAS) and storage area networks (SANs)) and computer software (i.e., instructions that allows the computing device to function in a particular way).

The communication device of the computing device may transmit and receive requests and responses to and from other interconnected computing devices. For example, although such requests and responses may be made by the same transmission control protocol (TCP) session, they are not limited to this and may be transmitted and received, for example, on a UDP (user datagram protocol) datagram.

In addition, in a broad sense, the communication device may include a keyboard, a mouse, and other external input devices for receiving commands or instructions, and a printer, a display, and other external output devices.

In addition, the processor of the computing device may include hardware configurations such as a micro processing unit (MPU), a central processing unit (CPU), a graphics processing unit (GPU), a neural processing unit (NPU) or a tensor processing unit (TPU), a cache memory, a data bus and the like.

First Embodiment

Figure 1:
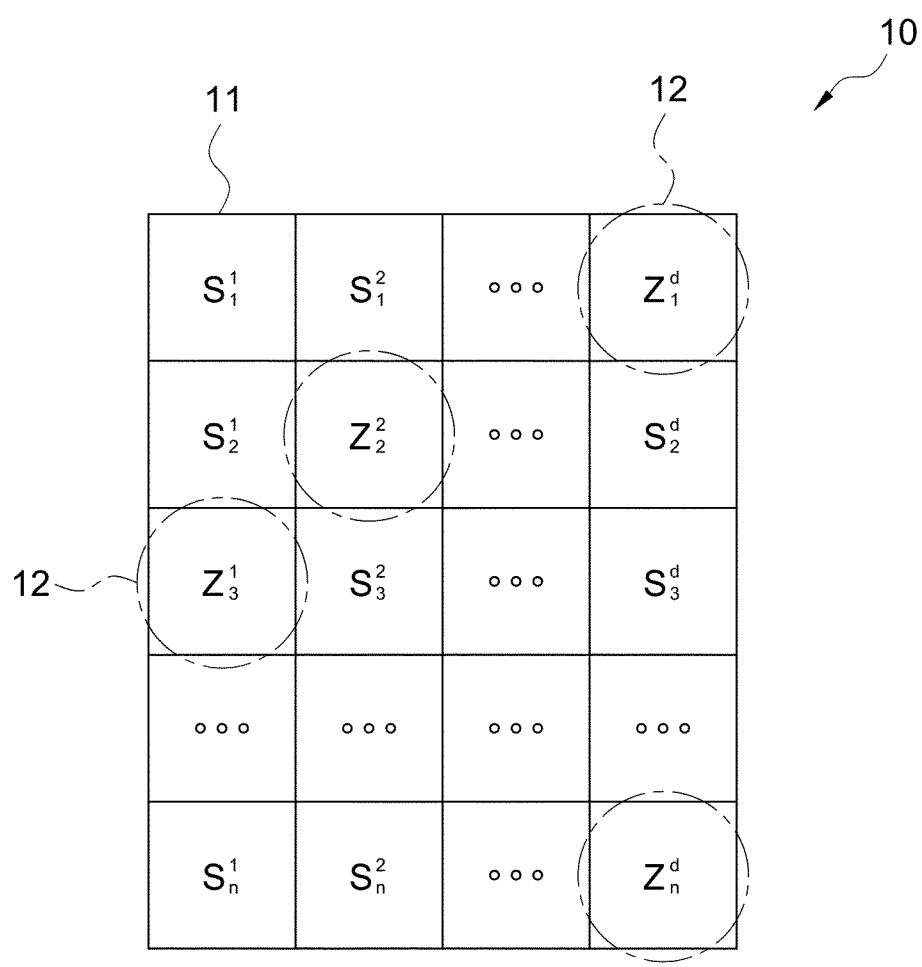
FIG. 1 is an exemplary view showing a dataset including general missing data.
Figure 2:
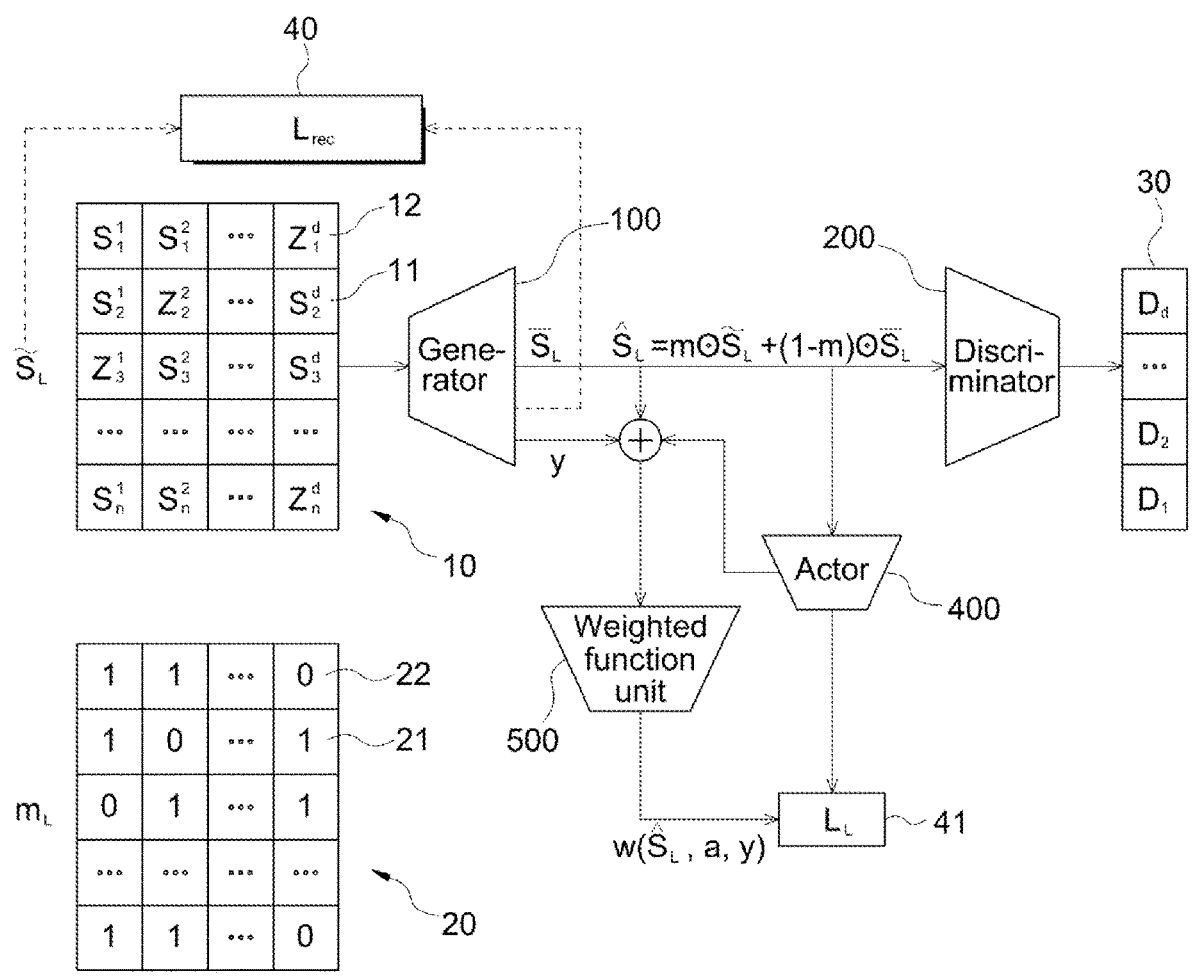
FIG. 2 is a block diagram showing the configuration of a classification system based on a generative adversarial network according to an embodiment of the present invention.
Figure 3:
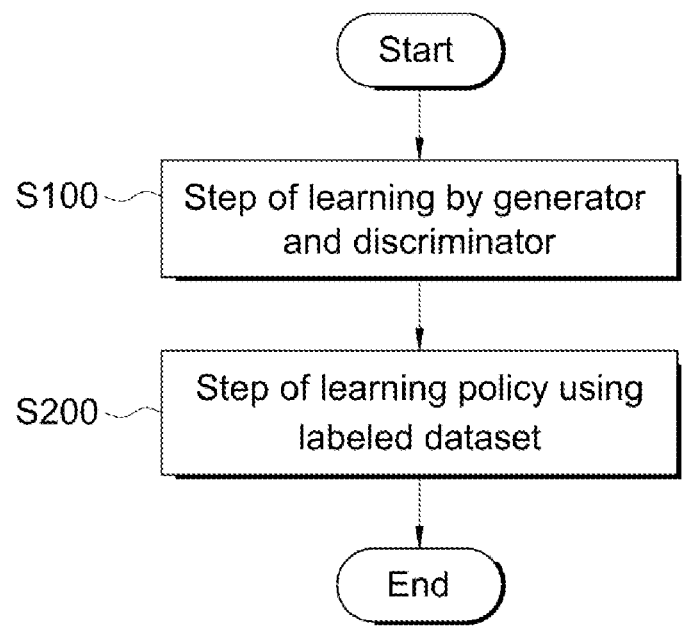
FIG. 3 is a flowchart illustrating a classification method based on a generative adversarial network according to an embodiment of the present invention.
Figure 4:
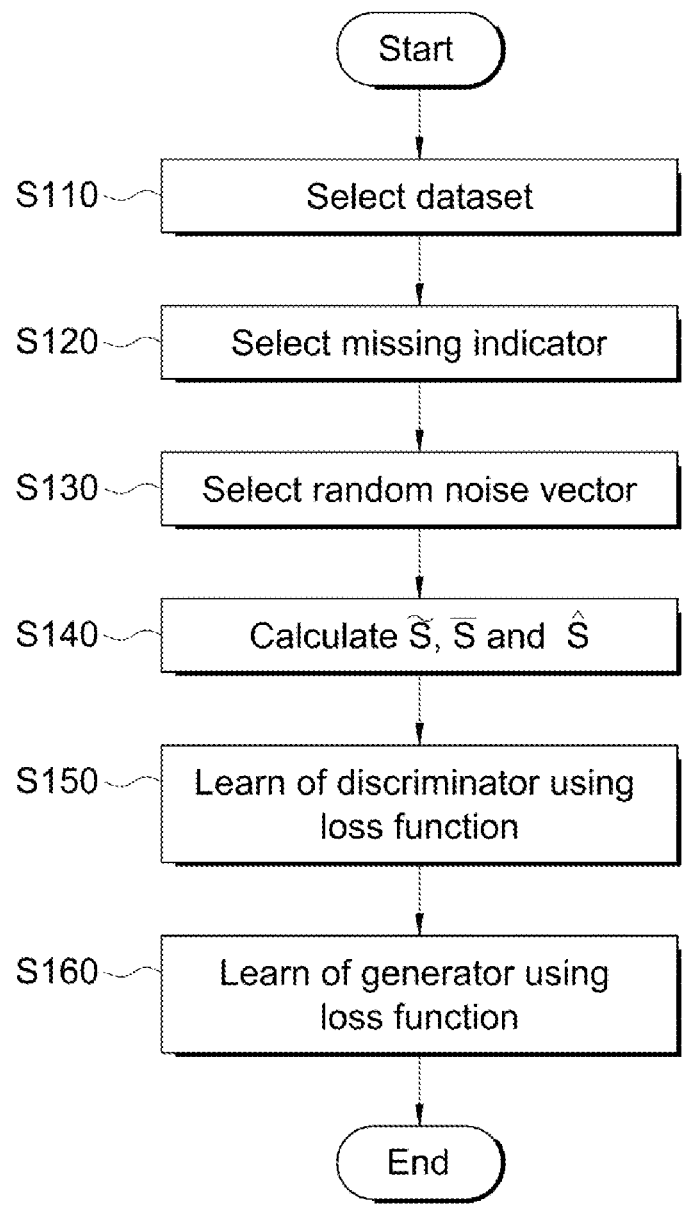
FIG. 4 is a flowchart illustrating a missing data learning process of the classification method based on a generative adversarial network according to FIG. 3.
Figure 5:
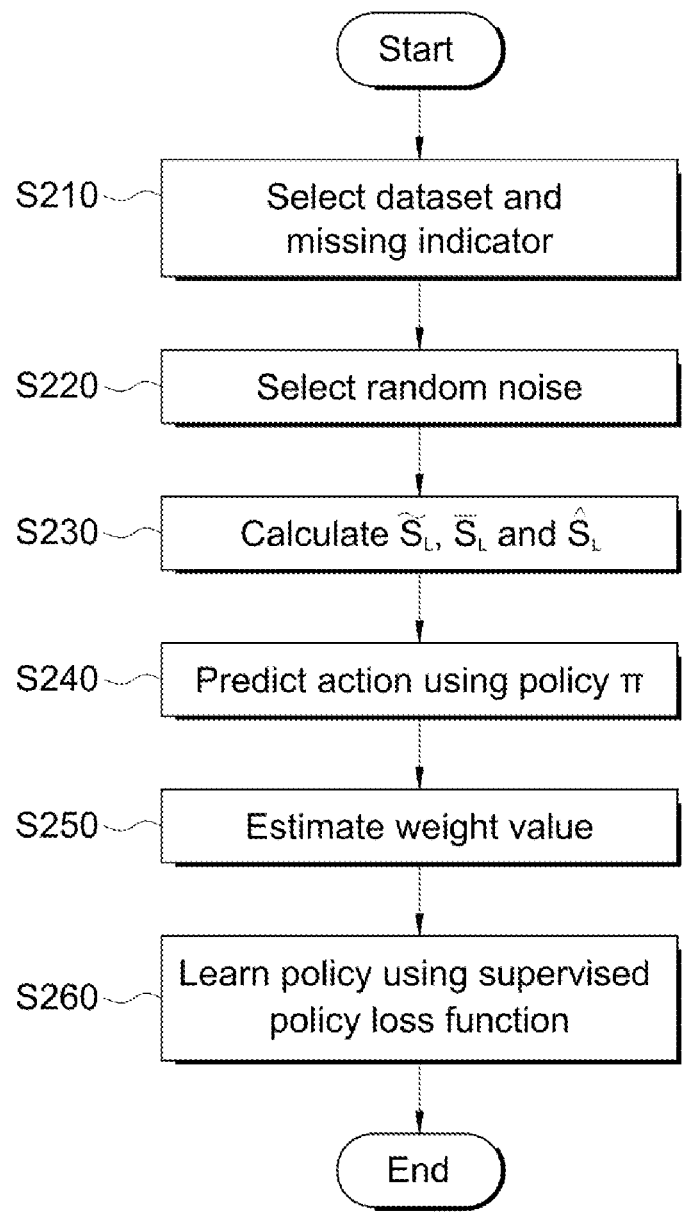
FIG. 5 is a flowchart illustrating a supervised classification learning process using a weight value of the classification method based on a generative adversarial network according to FIG. 3.
Figure 6:
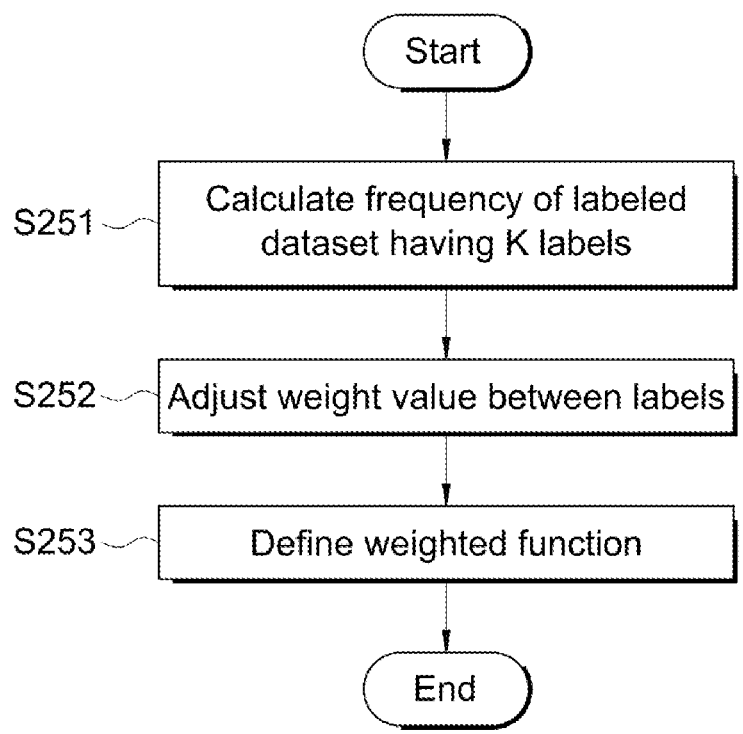
FIG. 6 is a flowchart illustrating a weight value estimation process of the classification method based on a generative adversarial network according to FIG. 3.

FIG. 2 is a block diagram showing the configuration of a classification system based on a generative adversarial network according to an embodiment of the present invention, FIG. 3 is a flowchart illustrating a classification method based on a generative adversarial network according to an embodiment of the present invention, FIG. 4 is a flowchart illustrating a missing data learning process of the classification method based on a generative adversarial network according to FIG. 3, FIG. 5 is a flowchart illustrating a supervised classification learning process using a weight value of the classification method based on a generative adversarial network according to FIG. 3, and FIG. 6 is a flowchart illustrating a weight value estimation process of the classification method based on a generative adversarial network according to FIG. 3.

Referring to FIGS. 2 to 6, a classification system based on a generative adversarial network includes a generator 100, a discriminator 200, an actor 400, and a weighted function unit 500.

The generator 100 and the discriminator 200 use a generative adversarial network (GAN), which is a network in a competition structure, and the generator 100 performs learning for generating a missing imputation value for deceiving the discriminator 200 by seeing distribution of original data, and the discriminator 200 performs learning for discriminating data generated by the generator 100.

In addition, the generator 100 performs learning for generating a missing imputation value for deceiving the discriminator 200 with reference to distribution of original data.

In addition, the generator 100 is a classification system based on a generative adversarial network using a labeled data $S_L$, and generates a missing imputation value from the labeled dataset 10.

In addition, as a preprocessing process, the generator 100 may perform a learning process for generating a missing imputation value from an unlabeled dataset, rather than a labeled dataset.

In addition, the generator 100 selects n states from the dataset 10 and n missing indicators ($m_L$) 20 indicating whether state elements corresponding to the n states are missing, as an input for generating missing imputation values.

Here, $S_L$ means a dataset in which each state is labeled, and $m_L$ means a labeled missing indicator.

In addition, the labeled dataset 10 includes n states configured of $S_1, S_2, S_3, \ldots, S_n \in R^d$, where d is a state feature.

In addition, the j-th element of state i is expressed as $s_i^j$, where j is a constant equal to or smaller than d, and $s_i^j$ may have a scalar or missing value.

In addition, the dataset 10 may be configured of at least one data among labeled data with labels and unlabeled data without labels.

In addition, the missing indicator 20 is an indicator for indicating whether a state element is missing and uses $m_1, m_2, m_3, \ldots, m_n \in R^d$, and at this point, as for $m_i$, the missing indicator value 22 may be expressed as '0' when $s_i^j$ has a missing data, otherwise the missing indicator value 21 may be expressed as '1'.

In addition, the generator 100 receives and calculates a missing imputation value $\tilde{S}$ obtained by replacing a missing element 12 randomly selected with respect to an arbitrary element 11 among the n states with a previously set value, e.g., random noise 'Z' randomly selected from a uniform distribution between '0' and '1'.

At this point, the missing imputation value $\tilde{S}$ is received as an input through the following equation.

$$\tilde{S} = m \odot s + (1-m) \odot z$$

Here, m is a vector of a missing indicator corresponding to state s, and z is a vector of noise randomly selected from a uniform distribution between '0' and '1', and the vectors may be expressed as an element-wise product.

In addition, the generator 100 outputs a state $\overline{S}$ configured of a vector of elements generated using the missing imputation value $\tilde{S}$.

In addition, the generator 100 generates and outputs a missing imputation value $\hat{S}$ replaced with state $\overline{S}$.

At this point, through the output of the generator 100, data corresponding to the missing imputation value $\hat{S}$ according to the following equation may be used for learning of the discriminator 200.

$$\hat{S} = m \odot s + (1-m) \odot \overline{S}$$

Here, m is a vector of a missing indicator corresponding to state s.

The discriminator 200 is a configuration for discriminating the missing imputation value $\tilde{S}$ generated by the generator 100 from the original data, and discriminates whether each element output from the discriminator 200 is a missing value (fake) or not (real), and as a result, m may be used as a label for $\hat{S}$.

In addition, the discriminator 200 may express the i-th output of the discriminator 200 corresponding to a probability that the i-th element of state $\hat{S}$ is not a missing data as $S \rightarrow [0, 1]^d$ through a function.

In addition, the discriminator 200 may express the output as $D_1, D_2, D_3, \ldots, D_d$ through a discriminator output indicator 30.

Meanwhile, the generator 100 and the discriminator 200 may learn through a loss function, and the generator loss function for learning of the generator 100 may be as shown in the following equation.

$$L_G = -\Sigma_{i=1}^d \mathbb{E}[(1-m^i) * \log D^i(\hat{s})] + \lambda \mathbb{E}(\Sigma_{i=1}^d m^i(s^i - \overline{s}^i)^2)$$

Here, the generator loss function may be configured of two terms, and the first term maximizes the probability $D^i$ of missing data.

In addition, the second term is a reconstruction loss 40 that transforms the missing data generated by the generator 100 to be close to the original data using distribution of the original data, where $\lambda$ is a scale factor.

In addition, the discriminator loss function for learning of the discriminator 200 may be as shown in the following equation.

$$L_D = -\Sigma_{i=1}^d \mathbb{E}[(1-M^i) * \log(1-D^i(\hat{s}))] - \Sigma_{i=1}^d \mathbb{E}[m^{i*} \log D^i(\hat{s})]$$

The discriminator loss function may be configured to learn in a direction that maximizes the probability $D^i$ when the i-th element is a missing data, otherwise in a direction that minimizes the probability $D^i$ on the contrary.

The actor 400 estimates a probability of performing an action from a labeled dataset using the vector configured of missing imputation values generated by the generator 100 as a policy.

In addition, the actor 400 may be a component of an 'actor-critic' architecture, which is a decision-making framework well-known in the reinforcement learning.

In addition, the actor 400 receives a state as an input and outputs a probability of performing a given action, and in order to learn the policy $\pi$ using the 'actor-critic', a policy loss function 41 may be defined as shown in the following equation.

$$L_\pi = \begin{cases} -\mathbb{E}[[a\log\pi(\hat{s}) + (1-a)\log(1-\pi(\hat{s}))] * \chi(\hat{s}, a)], & \text{binomial} \\ -\mathbb{E}\left[\sum_{y=0,1\ldots} a^y \log\pi^y(\hat{s}) * \chi(\hat{s}, a)\right], & \text{categorical} \end{cases}$$

Here, $\chi(\hat{s},a)$ is a function evaluated from a critic that determines whether the action predicted in a given state is good or bad.

In addition, $\chi(\hat{s},a)$ may have a form such as 'total discounted reward', 'action-value function', or 'TD-error'.

The policy loss function described above is a general form in which an action is not determined, and the actor 400 should learn from both correct and incorrect actions.

However, when an estimated value of $\chi(\hat{s},a)$ is bad, the policy loss function is optimized in a wrong direction and may converge or diverge slowly as a result.

Accordingly, the actor 400 according to an embodiment of the present invention may be defined as shown in the following equation to omit a case of learning the policy loss function 41 from an incorrect action and use only a given correct label.

$$L_L = \begin{cases} -\mathbb{E}[[y\log\pi(\hat{s}) + (1-y)\log(1-\pi(\hat{s}))] * W(\hat{s}, a, y)], & \text{binomial} \\ -\mathbb{E}\left[\sum_{y=0,1\ldots} y^y \log\pi^y(\hat{s}) * W(\hat{s}, a, y)\right], & \text{categorical} \end{cases}$$

Here, y is a label of a state, a is an action predicted by policy $\pi$ for a given state, and $W(\hat{s}, a, y)$ is a weight value of a reward for the state, action, and label.

That is, the predicted action is replaced with a correct label, and function $\chi(\hat{s},a)$ is replaced with a weighted function W.

Therefore, the supervised policy loss $L_L$ is a classification loss weight value obtained from the weighted function $W(\hat{s}, a, y)$.

In addition, when the weighted function is '1' for all states, actions, and labels, $L_L$ will be completely equal to the classification loss weight value.

In addition, the actor 400 may learn the supervised policy using the weight value of the reward generated from the weighted function unit 500 through the policy loss function 41 for supervised classification.

The weighted function unit 500 generates a weight value of a reward for the state, action, and label on the basis of the frequency of the label from a labeled dataset as a weight value of a reward that can be taken from state ŝ.

Here, when it is assumed that the weighted function unit 500 has a labeled dataset $S_L$ having K labels (k=0, 1, . . . , K−1), the frequency of the K-th label may be approximated as shown in the following equation.

$$\varphi_k = \frac{n_k}{\sum_{k=0}^{k-1} n_k}$$

Here, $n_k$ is the number of samples of the k-th label, and $\varphi_k$ is within the range of (0, 1).

In addition, the weight coefficient $\omega_k$ may be estimated as shown in the following equation for each label.

$$\omega_k = 1 - \log_b \varphi_k$$

Here, b is based on logarithm (b=e, 10, . . . ).

Therefore, the weight value of the reward may be generated to balance a minority label and a majority label by giving a high weight value of reward to the minority label with a relatively low frequency of label, and giving a low weight value of reward to the majority label with a relatively high frequency of label.

In addition, the weighted function unit 500 may define a weighted function, i.e., a weight value of a reward for the state, action, and label, as shown in the following equation.

$$W(\hat{s}, a, y) = r(\hat{s}) * \begin{cases} \omega_y, & y = a, \text{right prediction} \\ \frac{\omega_y + \omega_a}{2}, & y \neq a, \text{wrong prediction} \end{cases}$$

Here, r(ŝ) is a reward that can be taken from state ŝ, a is an action predicted by policy π for a given state, y is a label of a state, and $\omega_y$ and $\omega_a$ are weight coefficients based on $\omega_k = 1 - \log_b \varphi_k$ (b is e based on logarithm, 10 . . . ).

Next, a classification and learning method based on a generative adversarial network using labeled data according to a first embodiment of the present invention is described.

The learning procedure may be divided into two steps of generating a missing value (S100) and generating a learning policy (S200).

In addition, each of steps S100 and S200 may update the missing value and the learning policy while repeating generation of a missing value and generation of a learning policy through various epochs of a labeled dataset, and one turn of the dataset is referred to as one epoch.

In addition, a classification system configured of a generator 100, a discriminator 200, an actor 400, and a weighted function unit 500 may use a generative adversarial network (GAN), which is.

First, step S100 of generating a missing imputation value learns the generator 100 and the discriminator 200, and performs, in each iteration, the step of randomly selecting n states from a dataset to be input into the generator 100 (S110), and the step of selecting n missing indicators (m) indicating whether state elements corresponding to the states are missing (S120).

At this point, steps S110 and S120 may be provided from an external terminal or a previously set dataset.

In addition, at steps S110 and S120, the dataset may be configured of at least data one among labeled data and unlabeled data.

When a vector obtained by replacing n states with previously set values, e.g., random noise 'Z' (here, Z∈[0, 1]) randomly selected from a uniform distribution between '0' and '1', is selected (S130) and input into the generator 100, the generator 100 calculates a missing imputation value S̃, a state S̄, and a missing imputation value Ŝ (S140).

Here, S̃ is a missing imputation value replaced with noise 'Z', S̄ indicates a state generated by the generator 100, and Ŝ is a missing imputation value replaced with a value generated by the generator.

At step S140, the generator 100 receives and calculates a vector configured of the missing imputation value S̃ replaced with random noise 'Z', and the vector is received as an input through the following equation.

$$\tilde{S} = m \odot s + (1-m) \odot z$$

In addition, the generator 100 generates state S̄ by calculating $\bar{S} \in R^d$ through $\bar{S} = G(\tilde{S})$.

In addition, the generator 100 calculates a missing imputation value Ŝ, which is a vector configured of the missing imputation value replaced with the generated state S̄, and this can be calculated through the following equation.

$$\hat{S} = m \odot s + (1-m) \odot \bar{S}$$

In addition, the missing imputation value Ŝ generated by the generator 100 is provided to the discriminator 200 so that the discriminator 200 may learn (S150) using the discriminator loss function.

In addition, the missing imputation value Ŝ generated by the generator 100 allows the generator 100 to learn (S160) using the generator loss function.

Meanwhile, an 'Adam optimizer' that optimally adjusts the update speed for each parameter may be used to learn all the components.

Step S200 of generating a learning policy includes the step of randomly selecting, in each iteration, n states from the labeled dataset $S_L$ and n missing indicators (mL) indicating whether state elements corresponding to the states are missing (S210).

Subsequently, when a vector obtained by replacing n states with previously set values, e.g., random noise 'Z' (here, Z∈[0, 1]) randomly selected from a uniform distribution between '0' and '1', is selected (S220) and input into the generator 100, the generator 100 calculates a missing imputation value $\tilde{S}_L$, a state $\bar{S}_L$, and a missing imputation value $\hat{S}_L$ (S230).

Here, $\tilde{S}_L$ is a missing imputation value replaced with noise 'Z', $\bar{S}_L$ indicates a state generated by the generator 100, and $\hat{S}_L$ is a missing imputation value replaced with a value generated by the generator.

At step S230, the generator 100 receives and calculates a vector configured of the missing imputation value $\tilde{S}_L$ replaced with random noise 'Z', and the vector is received as an input through the following equation.

$$\tilde{S}_L = m \odot s + (1-m) \odot z$$

In addition, the generator 100 generates state $\bar{S}_L$ by calculating $\bar{S}_L \in R^d$ through $\bar{S}_L = G(\tilde{S}_L)$.

In addition, the generator 100 calculates a missing imputation value $\hat{S}_L$, which is a vector configured of the missing imputation value replaced with the generated state $\overline{S}_L$, and this can be calculated through the following equation.

$$\hat{S}_L = m \odot S_L + (1-m) \odot \overline{S}_L$$

Subsequently, the actor 400 estimates a probability for performing an action through the policy $a=\pi(\hat{S}_L)$ on the basis of the generated missing imputation value $\hat{S}_L$ (S240).

At this point, the weighted function unit 500 generates a weight value of a reward for the state, action, and label through the following equation using the weighted function (S250).

$$W(\hat{s}, a, y) = r(\hat{s}) * \begin{cases} \omega_y, & y = a, \text{ right prediction} \\ \dfrac{\omega_y + \omega_a}{2}, & y \neq a, \text{ wrong prediction} \end{cases}$$

In addition, at step S250, the weighted function unit 500 may reflect a weight value of a reward for the state, action, and label on the basis of the frequency of the label from a labeled dataset as a weight value of a reward that can be taken from the state.

At this point, the label frequency may be approximated as shown in the following equation.

$$\varphi_k = \frac{n_k}{\sum_{k=0}^{k-1} n_k}$$

Subsequently, the weight value generated at step S250 is learned (S260) through the supervised policy loss function 41 using the following equation.

$$L_L = \begin{cases} -\mathbb{E}\left[[y \log \pi(\hat{s}) + (1-y)\log(1-\pi(\hat{s}))] * W(\hat{s}, a, y)\right], & \text{binomial} \\ -\mathbb{E}\left[\sum_{y=0,1\ldots} y^y \log \pi^y(\hat{s}) * W(\hat{s}, a, y)\right], & \text{categorical} \end{cases}$$

Here, y is a label of a state, a is an action predicted by policy $\pi$ for a given state, and $W(\hat{s}, a, y)$ is a weight value of a reward for the state, action, and label.

Meanwhile, an 'Adam optimizer' that optimally adjusts the update speed for each parameter may be used to learn all the components.

Second Embodiment

Figure 7:
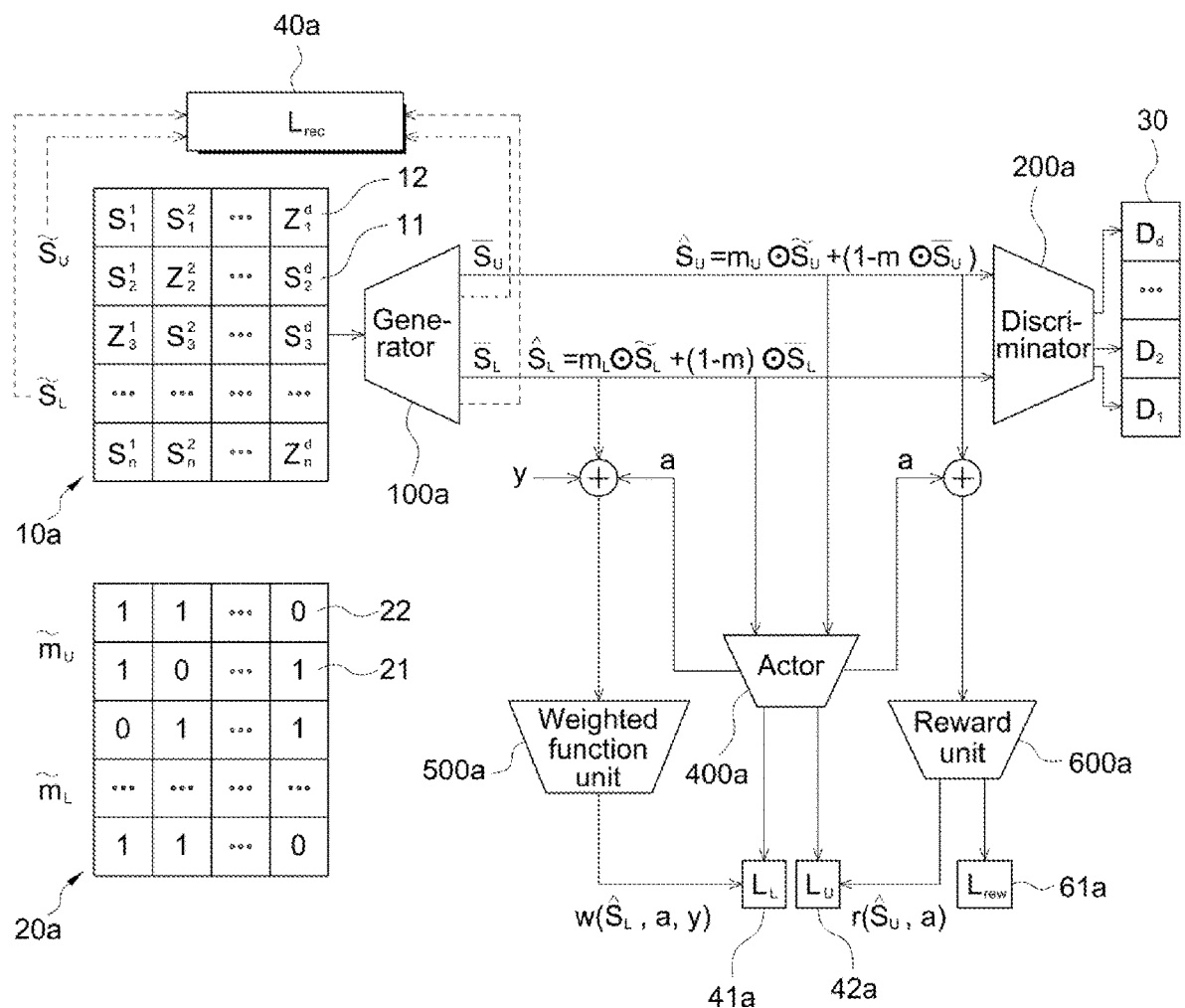
FIG. 7 is a block diagram showing the configuration of a classification system based on a generative adversarial network according to another embodiment of the present invention.
Figure 8:
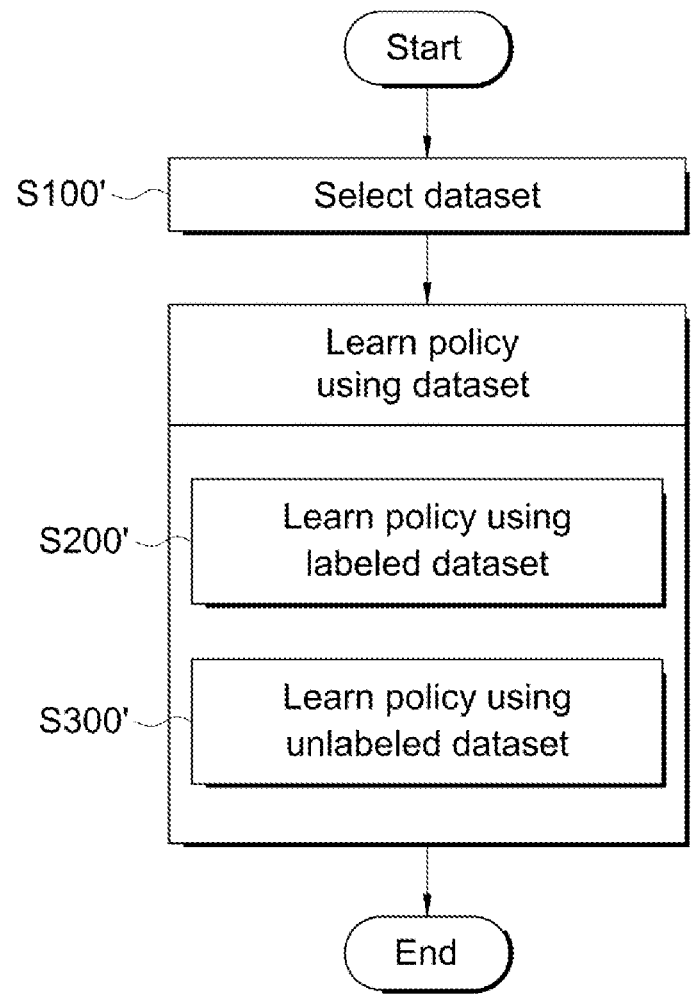
FIG. 8 is a flowchart illustrating a classification method based on a generative adversarial network according to another embodiment of the present invention.
Figure 9:
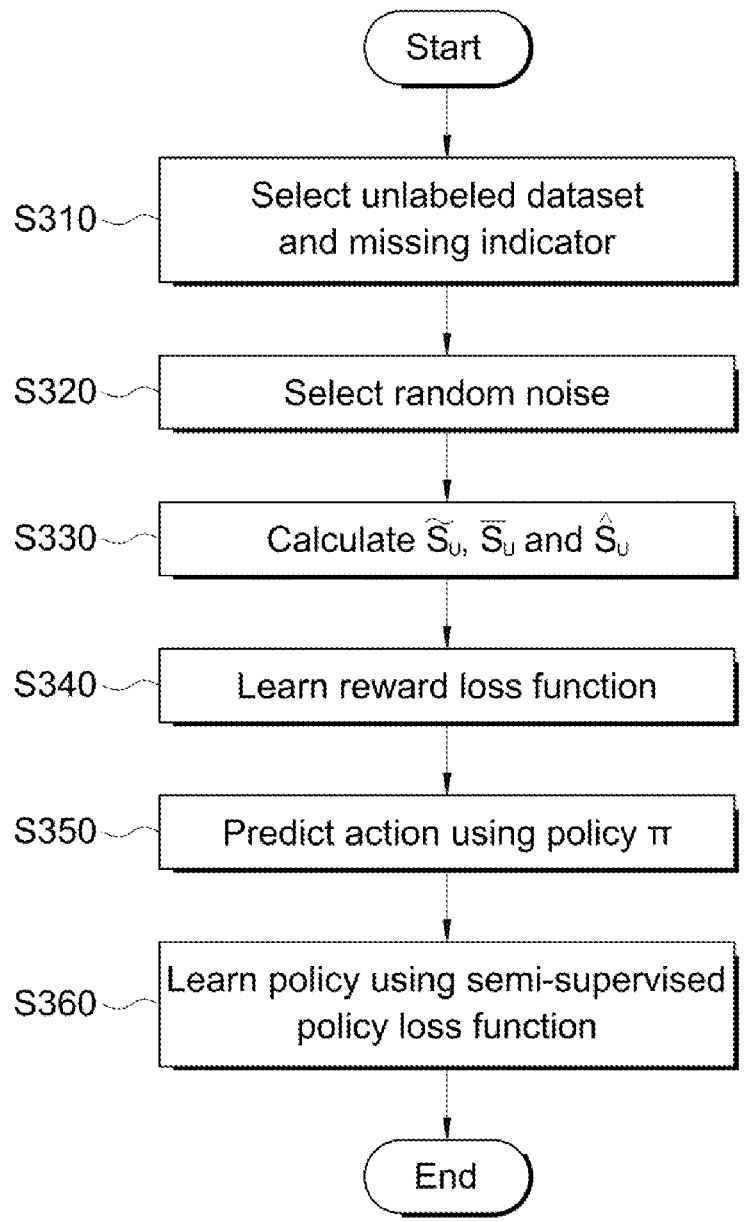
FIG. 9 is a flowchart illustrating a classification learning process of unlabeled data of the classification method based on a generative adversarial network according to FIG. 8.

FIG. 7 is a block diagram showing the configuration of a classification system based on a generative adversarial network according to a second embodiment of the present invention, FIG. 8 is a flowchart illustrating a classification method based on a generative adversarial network according to a second embodiment of the present invention, and FIG. 9 is a flowchart illustrating a classification learning process of unlabeled data of the classification method based on a generative adversarial network according to FIG. 8.

Referring to FIGS. 7 to 9, a classification system based on a generative adversarial network is configured to include a generator 100a, a discriminator 200a, an actor 400a, a weighted function unit 500a, and a reward unit 600a.

The generator 100a and the discriminator 200a use a generative adversarial network (GAN), which is a network in a competition structure, and the generator 100a performs learning for generating missing data for deceiving the discriminator 200a by seeing distribution of the original data, and the discriminator 200a performs learning for discriminating data generated by the generator 100a.

In addition, the generator 100a performs learning for generating missing data that deceives the discriminator 200a with reference to distribution of original data.

In addition, the generator 100a may use a labeled dataset $S_L$ with labels or an unlabeled dataset $S_U$ without labels.

Here, L means a dataset in which a state has a label, U means a dataset in which a state does not have a label, and an arbitrary dataset may be input from an external terminal.

In addition, as a preprocessing process, the generator 100a may perform a learning process for generating a missing imputation value from a labeled dataset $S_L$ or an unlabeled dataset $S_U$.

In addition, as a preprocessing process, the generator 100a may perform a learning process for generating a missing imputation value from an unlabeled dataset without labels, rather than a labeled dataset with labels.

In addition, the generator 100a selects n states from the dataset 10a and n missing indicators 20a indicating whether state elements corresponding to the n states are missing, as an input for generating missing imputation values.

In the case of the missing indicator 20a, a labeled dataset $S_L$ with labels may be classified as $M_L$, and an unlabeled dataset $S_U$ without labels may be classified as $M_U$, like the labeled dataset $S_L$ with labels and the unlabeled dataset $S_U$ without labels.

In addition, the dataset 10a includes n states configured of $S_1, S_2, S_3, \ldots, S_n \in R^d$, where d is a state feature.

In addition, the j-th element of state i is expressed as $s_i^j$, where j is a constant equal to or smaller than d, and $s_i^j$ has a scalar or missing value.

In addition, the dataset 10a may be configured of at least one data among labeled data and unlabeled data.

In addition, the missing indicator 20a is an indicator for indicating whether a state element is missing and uses $m_1$, $m_2, m_3, \ldots, m_n \in R^d$, and at this point, as for $m_i$, the missing indicator value 22 is expressed as '0' when $s_i^j$ has a missing data, otherwise the missing indicator value 21 is expressed as '1'.

In addition, the generator 100a receives and calculates a missing imputation value $\tilde{S}$ obtained by replacing a missing element 12 randomly selected with respect to an arbitrary element 11 among the n states with a previously set value, e.g., random noise 'Z' randomly selected from a uniform distribution between '0' and '1'.

At this point, the missing imputation value $\tilde{S}$ is received as an input through the following equation.

$$\tilde{S} = m \odot s + (1-m) \odot z$$

Here, m is a vector of a missing indicator corresponding to state s, and z is a vector of noise randomly selected from a uniform distribution between '0' and '1', and the vectors may be expressed as an element-wise product.

In addition, the generator 100a outputs a state $\overline{S}$ configured of a vector of elements generated using the missing imputation value $\tilde{S}$.

In addition, the generator 100a generates and outputs a missing imputation value $\hat{S}$ replaced with state $\overline{S}$.

At this point, through the output of the generator 100a, data corresponding to the missing imputation value $\hat{S}$ according to the following equation may be used for learning of the discriminator 200a.

$$\hat{S} = m \odot s + (1-m) \odot \overline{S}$$

Here, m is a vector of a missing indicator corresponding to state s.

The discriminator 200*a* is a configuration for discriminating the missing imputation value Ŝ generated by the generator 100*a* from the original data, and discriminates whether each element output from the discriminator 200*a* is a missing value (fake) or not (real), and as a result, m may be used as a label for Ŝ.

In addition, the discriminator 200*a* may express the i-th output of the discriminator 200*a* corresponding to a probability that the i-th element of state Ŝ is not a missing data as $S \to [0, 1]^d$ through a function.

In addition, the discriminator 200*a* may express the output as $D_1, D_2, D_3, \ldots, D_d$ through a discriminator output indicator 30.

Meanwhile, the generator 100*a* and the discriminator 200*a* may learn through a loss function, and the generator loss function for learning of the generator 100*a* may be as shown in the following equation.

$$L_G = -\Sigma_{i=1}^d \mathbb{E}\left[(1-m^i)*\log D^i(\hat{s})\right] + \lambda \mathbb{E}\left(\Sigma_{i=1}^d m^i(s^i - \hat{s}^i)^2\right)$$

Here, the generator loss function may be configured of two terms, and the first term maximizes the probability $D^i$ of missing data.

In addition, the second term is a reconstruction loss 40*a* that transforms the missing data generated by the generator 100*a* to be close to the original data using distribution of the original data, where λ is a scale factor.

In addition, the discriminator loss function for learning of the discriminator 200*a* may be as shown in the following equation.

$$L_D = -\Sigma_{i=1}^d \mathbb{E}\left[(1-m^i)*\log(1-D^i(\hat{s}))\right] - \Sigma_{i=1}^d \mathbb{E}\left[m^i * \log D^i(\hat{s})\right]$$

The actor 400*a* estimates a probability of performing an action from a labeled dataset using the vector configured of missing imputation values generated by the generator 100*a* as a policy.

In addition, the actor 400*a* may be a component of an 'actor-critic' architecture, which is a decision-making framework well-known in the reinforcement learning.

In addition, the actor 400*a* may generate a label of a given state.

In addition, the actor 400*a* receives a state as an input and outputs a probability of performing a given action, and in order to learn the policy π using the 'actor-critic', a policy loss function may be defined as shown in the following equation.

$$L_\pi = \begin{cases} -\mathbb{E}\left[[a\log\pi(\hat{s}) + (1-a)\log(1-\pi(\hat{s}))] * \chi(\hat{s}, a)\right], & \text{binomial} \\ -\mathbb{E}\left[\sum_{y=0,1\ldots} a^y \log\pi^y(\hat{s}) * \chi(\hat{s}, a)\right], & \text{categorical} \end{cases}$$

Here, $\chi(\hat{s},a)$ is a function evaluated from a critic that determines whether the action predicted in a given state is good or bad.

In addition, $\chi(\hat{s},a)$ may have a form such as 'total discounted reward', 'action-value function', or 'TD-error'.

The policy loss function described above is a general form in which an action is not determined, and the actor 400*a* should learn from both correct and incorrect actions.

However, when an estimated value of $\chi(\hat{s},a)$ is bad, the policy loss function is optimized in a wrong direction and may converge or diverge slowly as a result.

Therefore, the actor 400*a* according to an embodiment of the present invention may be defined as shown in the following equation to omit a case of learning the policy loss function 41*a* from an incorrect action and use only a given correct label.

$$L_L = \begin{cases} -\mathbb{E}\left[[y\log\pi(\hat{s}) + (1-y)\log(1-\pi(\hat{s}))] * W(\hat{s}, a, y)\right], & \text{binomial} \\ -\mathbb{E}\left[\sum_{y=0,1\ldots} y^y \log\pi^y(\hat{s}) * W(\hat{s}, a, y)\right], & \text{categorical} \end{cases}$$

Here, y is a label of a state, a is an action predicted by policy π for a given state, and W(ŝ, a, y) is a weight value of a reward for the state, action, and label.

That is, the predicted action is replaced with a correct label, and function $\chi(\hat{s},a)$ is replaced with a weighted function W.

Therefore, the supervised policy loss $L_L$ is a classification loss weight value obtained from the weighted function W(ŝ, a, y).

In addition, when the weighted function is '1' for all states, actions, and labels, $L_L$ is completely equal to the classification loss weight value.

In addition, the actor 400*a* may learn the supervised policy using the weight value generated from the weighted function unit 500*a* through the policy loss function ($L_L$) 41*a* for supervised classification.

In addition, the actor 400*a* may learn the policy by reflecting the policy of the actor 400*a* and the output of the reward unit 600*a* to the semi-policy loss function ($L_U$) 42*a* for semi-supervised classification.

That is, the semi-supervised classification performs cooperation between the action (a) of the actor 400*a* and the output of the reward unit 600*a* by utilizing the unlabeled dataset. Through the cooperation, the policy of the actor 400*a* functioning as a generator generates a label of a given state, and the reward unit 600*a* functioning as a discriminator determines whether or not each state-action (ŝ, a) pair is a labeled dataset.

In addition, the semi-policy loss function ($L_U$) 42*a* may operate together with the output of the reward unit 600*a* and the policy of the actor 400*a* to utilize the unlabeled dataset $S_U$.

The semi-policy loss function ($L_U$) may be defined as shown in the following equation.

$$L_u = \begin{cases} -\mathbb{E}\left[[a\log\pi(\hat{s}_u) + (1-a)\log(1-\pi(\hat{s}_u))] * r(\hat{s}_u, a)\right], & \text{binomial} \\ -\mathbb{E}\left[\sum_{y=0,1\ldots} a^y \log\pi^y(\hat{s}_u) * r(\hat{s}_u, a)\right], & \text{categorical} \end{cases}$$

Here, the semi-policy loss function ($L_U$) may be obtained from the policy loss, and $\chi(\hat{s},a)$ may be replaced with $r(\hat{s}_u,a)$, which is a reward of the reward unit 600*a* defined as follows.

In addition, $r(\hat{s}_u,a)$ may be defined as shown in the following equation.

$$r(\hat{s}_u, a) = \begin{cases} 1, & R(\hat{s}_L, a) \geq \varepsilon \\ 0, & \text{otherwise} \end{cases}$$

Here, $r(\hat{s}_L,a)$ is the probability of whether the (ŝ,a) pair is a label in a labeled dataset, and $\varepsilon \in [0, 1]$ is a threshold value considering whether the state-action pair is likely to be included in the labeled dataset.

The weighted function unit 500*a* generates a weight value of a reward for the state, action, and label on the basis of the frequency of the label from a labeled dataset $S_L$ as a weight value of a reward that can be taken from state $\hat{s}$.

Here, when it is assumed that the weighted function unit 500*a* has a labeled dataset $S_L$ having K labels (k=0, 1, ..., K−1), the frequency of the K-th label may be approximated as shown in the following equation.

$$\varphi_k = \frac{n_k}{\sum_{k=0}^{k-1} n_k}$$

Here, $n_k$ is the number of samples of the k-th label, and $\varphi_k$ is within the range of (0, 1).

In addition, the weight coefficient $\omega_k$ may be estimated as shown in the following equation for each label.

$$\omega_k = 1 - \log_b \varphi_k$$

Here, b is based on logarithm (b=e, 10, ...).

It may operate to balance the labels by giving a high weight of reward to a minority label with a relatively low frequency of label, and giving a low weight of reward to a majority label with a relatively high frequency of label.

In addition, the weighted function unit 500*a* may define a weighted function for each class, i.e., a weight value of a reward for the state, action, and label, as shown in the following equation.

$$W(\hat{s}, a, y) = r(\hat{s}) * \begin{cases} \omega_y, & y = a, \text{ right prediction} \\ \frac{\omega_y + \omega_a}{2}, & y \neq a, \text{ wrong prediction} \end{cases}$$

Here, $r(\hat{s})$ is a reward that can be taken from state $\hat{s}$, a is an action predicted by policy $\pi$ for a given state, y is a label of a state, and $\omega_y$ and $\omega_a$ are weight coefficients based on $\omega_k = 1 - \log_b \varphi_k$ (b is e based on logarithm, 10 ...).

The reward unit 600*a* is a configuration for determining whether there is a state-action ($\hat{s}$, a) pair in the labeled dataset $S_L$, and providing a reward to learn the policy of the actor 400*a* for an unlabeled dataset.

In addition, the reward unit 600*a* may be formed as a reward model that provides a reward for a probability of the state-action ($\hat{s}$, a) pair in the labeled dataset.

In addition, the reward model is a function that outputs a probability of whether the state-action ($\hat{s}$, a) pair in the labeled dataset is a label, and it may be R: S×A→[0, 1].

The label of each state-action ($\hat{s}$, a) pair may be defined as shown in the following equation.

$$m_y = \begin{cases} 1, & a = y \\ 0, & a \neq y \end{cases}$$

Here, m is a missing indicator of a state, y is a label of a state, and a is an action predicted by the policy of the actor for a given state.

In addition, the reward unit 600*a* maximizes the probability and provides to a reward $r(\hat{s}_L, a)$ of the reward unit 600*a* when the state-action ($\hat{s}$, a) pair is a label in a labeled dataset, and minimizes the probability and provides to a reward $r(\hat{s}_U, a)$ of the reward unit 600*a* when the state-action ($\hat{s}$, a) pair is a label not in a labeled dataset, and the reward unit 600*a* may learn using the reward model loss function ($L_{rew}$) 61*a*.

In addition, the reward model loss function ($L_{rew}$) 61*a* may be configured of two parts, and learns to maximize the probability when the state-action ($\hat{S}_L$, a) pair is a label in a labeled dataset, and learns to minimize the probability when the state-action ($\hat{S}_L$, a) pair is a label not in a labeled dataset.

At this point, the reward model loss function may be defined as shown in the following equation.

$$L_{rew} = -\mathbb{E}[m_y * \log R(\hat{s}_L, a)] = -IE[(1-m_y) * \log(1-R(\hat{s}_L, a))]$$

Next, a supervised classification and learning method based on a generative adversarial network according to a second embodiment of the present invention is described.

The learning procedure may be configured of the step of generating a learning policy including the steps of generating a missing imputation value (S100'), learning using a labeled dataset (S200'), and learning using an unlabeled dataset (S300).

In addition, each of steps S100', S200' and S300 may update the missing value and the learning policy while repeating generation of a missing value and generation of a learning policy through various epochs of a labeled dataset, and one turn of the dataset is referred to as one epoch.

In addition, a classification system configured of a generator 100*a*, a discriminator 200*a*, an actor 400*a*, a weighted function unit 500*a*, and a reward unit 600*a* may use a generative adversarial network (GAN).

First, steps S100' and S200' of generating a missing imputation value are steps of performing a learning policy using a labeled dataset with labels, and since the generator 100*a* and the discriminator 200*a* operate in a manner the same as that of steps S100 and S200 according to a first embodiment, repetitive description of the same components will be omitted.

The step of generating a learning policy from an unlabeled dataset ($S_U$) without labels (S300) includes the step of randomly selecting n states from an unlabeled dataset ($S_U$) and n missing indicators (mU) indicating whether state elements corresponding to the states are missing (S310).

Subsequently, when a vector obtained by replacing n states with previously set values, e.g., random noise 'Z' (here, Z∈[0, 1]) randomly selected from a uniform distribution between '0' and '1', is selected (S320) and input into the generator 100*a*, the generator 100*a* calculates a missing imputation value $\tilde{S}_L$, a state $\overline{S}_L$, and a missing imputation value $\hat{S}_L$ (S330).

Here, $\tilde{S}_U$ is a missing imputation value replaced with noise 'Z', $\overline{S}_U$ indicates a state generated by the generator 100*a*, and $\hat{S}_U$ is a missing imputation value replaced with a value generated by the generator.

At step S330, the generator 100*a* receives and calculates a vector configured of the missing imputation value $\tilde{S}_U$ replaced with random noise 'Z', and the vector is received as an input through the following equation.

$$\tilde{S}_U = m \odot s + (1-m) \odot z$$

In addition, the generator 100*a* generates state $\overline{S}_U$ by calculating $\overline{S}_U \in R^d$ through $\overline{S}_U = G(\tilde{S}_U)$.

In addition, the generator 100*a* calculates a missing imputation value $\hat{S}_U$ replaced with the generated state $\overline{S}_U$, and the missing imputation value $\hat{S}_U$ may be calculated through the following equation.

$$\hat{S}_U = m_U \odot \tilde{s}_U + (1-m_U) \odot \overline{s}_U$$

Subsequently, the reward unit 600a provides the reward of the reward unit 600a as the probability of the state-action (Ŝ, a) pair for the labeled dataset, and the reward unit 600a performs the step of learning using the reward model loss function ($L_{rew}$) (S340).

In addition, the reward unit 600a may be formed of a reward model, and the reward model is a function that outputs the probability of the state-action (Ŝ, a) pair in the labeled dataset, and may be R: S×A→[0, 1].

In addition, a label for each state-action (Ŝ, a) pair may be defined as shown in the following equation.

$$m_y = \begin{cases} 1, & a = y \\ 0, & a \neq y \end{cases}$$

Here, m is a missing indicator of a state, y is a label of a state, and a is an action predicted by the policy of the actor for a given state.

The reward model loss function ($L_{rew}$) learns to maximize the probability when the state-action ($\hat{S}_L$, a) pair is a label in a labeled dataset.

In addition, the reward model loss function ($L_{rew}$) learns to minimize the probability when the state-action ($\hat{S}_L$, a) pair is a label not in a labeled dataset.

At this point, the reward model loss function ($L_{rew}$) learns using the following equation.

$$L_{rew} = -\mathbb{E}[m_y^* \log R(\hat{s}_L, a)] - \mathbb{E}[(1-m_y)^* \log(1-R(\hat{s}_L, a))]$$

Thereafter, a process of estimating a probability $a = \pi(\hat{S}_U)$ of performing an action using the missing imputation value $\hat{S}_L$ and the policy generated by the actor 400a is performed (S350).

The reward of the reward model provided at step S340 and the prediction result of the action predicted at step S350 may be used for the actor 400a to learn the policy to be optimized in the semi-policy loss function 42a using the semi-policy loss function $L_u$ shown in the following equation (S360).

$$L_u = \begin{cases} -\mathbb{E}[[a\log\pi(\hat{s}_u) + (1-a)\log(1-\pi(\hat{s}_u))] * r(\hat{s}_u, a)], & \text{binomial} \\ -\mathbb{E}\left[\sum_{y=0,1...} a^y \log\pi^y(\hat{s}_u) * r(\hat{s}_u, a)\right], & \text{categorial} \end{cases}$$

Here, $r(\hat{s}_U, a)$ is a reward for the reward model function in the reward unit 600a.

In addition, $r(\hat{s}_U, a)$ may be defined as shown in the following equation.

$$r(\hat{s}_u, a) = \begin{cases} 1, & R(\hat{s}_L, a) \geq \varepsilon \\ 0, & \text{otherwise} \end{cases}$$

Here, $R(\hat{s}_L, a)$ is the probability of whether the labeled dataset (Ŝ, a) pair output from the reward unit is a label of a labeled dataset with labels or a label generated by the actor, and $\varepsilon \in [0, 1]$ is a threshold value considering whether the state-action pair is likely to be included in a labeled dataset.

Meanwhile, an 'Adam optimizer' that optimally adjusts the update speed for each parameter may be used to learn all the components.

Figure 10:
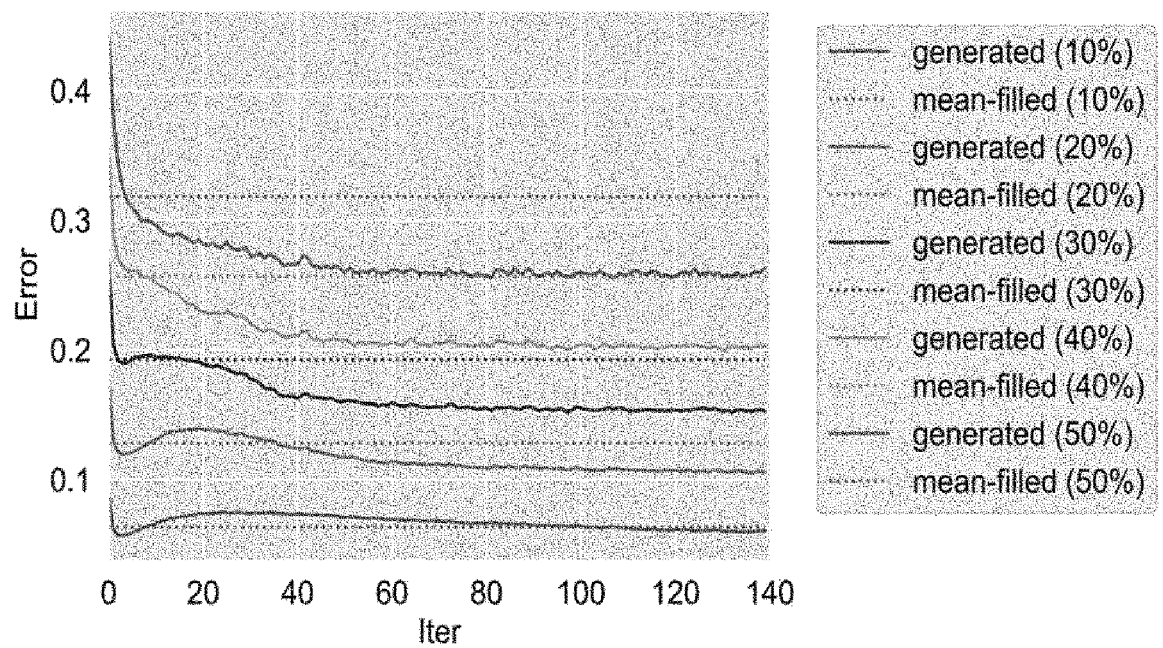
FIG. 10 is a graph showing an evaluation result according to various missing rates by utilizing a classification system based on a generative adversarial network using labeled data and unlabeled data according to an embodiment of the present invention.

FIG. 10 is a view showing data of an experiment using actual credit card transaction data including 22% fraudulent transactions disclosed by the University of California (UCI), and it is a result of processing the data at a ratio of 0.7 test set and 0.3 test set.

Here, the total dataset is assumed to express a degree of missing as a missing rate of 10%, 20%, 30%, 40%, or 50%, and the data is preprocessed by applying zero-mean normalization.

As is confirmed from FIG. 10, it can be seen that performance of the generator and the discriminator using a plurality of missing rates is appeared to be more similar to the original value by learning the generator and generating a missing imputation value, rather than averaging the performance ten or more times using the root mean square error indicator and simply filling the missing imputation value with the average.

In addition, it can be seen that the effect of the GAN also increases as the missing rate increases.

In addition, FIG. 11 is a graph showing distribution of values generated during the learning process.

As is confirmed from FIG. 11, it can be seen that distribution of values generated during the learning process appears to be more similar when distribution of the values during 0 epoch of FIG. 11(a), distribution of the values generated after 1 epoch of FIG. 11(b), and distribution of the values generated after 10 epochs of FIG. 11(c) are compared with distribution of original values.

In addition, FIG. 12 is an exemplary view showing performance with and without plug-in elements, in which the framework according to the present invention is compared with other state-of-art models using F1-score.

Here, it can be seen that as the GAN, the weighted function, and the reward model are sequentially implemented, performance is improved by 2.2%, 4.4%, and 1.04%, respectively.

This weighted function has the greatest influence on the performance, and this is since that when learning is performed using a weighted function, the policy gives more weight value to the minority class to learn.

As a result, it is possible to have better recall scores, and this allows to obtain better F1 scores.

In addition, the reward model may be helpful to improve the performance of the framework by adjusting ε.

In addition, ε limits how much information will be used to update policy from unlabeled data, and the higher the value, the stricter the use of unlabeled data is managed.

FIG. 12 is a graph showing comparison of performance according to the labeled data ratio and the missing rate.

FIG. 13 is a view showing a result of evaluation using a much imbalanced credit card dataset having a fraud rate of 0.172% taken from ULB, and the evaluation result is measured by the F1-score indicator.

As is known from FIG. 13(a), it can be seen that when the same number of labeled data is used, the framework according to the present invention outputs performance better than that of an existing mlp-based classifier.

In addition, it can be seen that the mlp-based classifier decreases the F1-score more rapidly when the missing rate increases, and this can be considered that the framework of the present invention is a better framework for handling missing values.

In addition, when the two frameworks sufficiently include labeled data, difference in the performance between the two frameworks may be narrowed.

For example, it can be seen that when only 50% of labeled data is included, performance of the framework according to the present invention is similar to that of using a complete labeled dataset.

In addition, the plot of FIG. 13(b) shows the output of the reward model according to the amount of labeled data, and it can be seen that the more the labeled data, the faster it converges to one value.

Although it has been described above with reference to preferred embodiments of the present invention, those skilled in the art may understand that the present invention may be variously modified and changed without departing from the spirit and scope of the present invention described in the claims below.

In addition, the reference numbers described in the claims of the present invention are only for clarity and convenience of explanation, and are not limited thereto, and in the process of describing the embodiments, thickness of lines or sizes of components shown in the drawings may be shown to be exaggerated for clarity and convenience of explanation, and since the terms mentioned above are terms defined in consideration of the functions in the present invention and may vary according to the intention of users or operators or the custom, interpretation of these terms should be made on the basis of the contents throughout this specification.

DESCRIPTION OF SYMBOLS 10, 10a: dataset
11: Element
12: Missing element
20, 20a: Missing indicator
21, 22: Missing indicator value
30: Discriminator output indicator
40, 40a: Loss function
41, 41a: Policy loss function
42, 42a: Semi-policy loss function
61a: Reward model loss function
100, 100a: Generator
200, 200a: Discriminator
400, 400a: Actor
500, 500a: Weighted function unit
600a: Reward unit

The invention claimed is:

1. A classification system based on a generative adversarial network, the system comprising:
 a generator for generating a missing imputation value for a missing part among states from a labeled dataset;
 a discriminator for discriminating the missing imputation value generated by the generator from original data;
 an actor for predicting an action through a policy with the missing imputation value generated by the generator; and
 a weighted function unit for generating a weight value of a reward on the basis of a state replaced with the missing imputation value, the predicted action, and a label of the labeled dataset, wherein
 the weighted function unit operates to balance labels by increasing the weight value of the reward for a label having a frequency lower than a predetermined threshold and decreasing the weight of the reward for a label having a frequency higher than a predetermined threshold, and
 the actor learns the policy to optimize a policy loss function by reflecting the predicted action and the weight value of the reward generated by the weighted function unit, wherein the weight value of the reward is defined by the following equation $$W(\hat{s}, a, y) = r(\hat{s}) * \begin{cases} \omega_y, & y = a, \text{ right prediction} \\ \dfrac{\omega_y + \omega_a}{2}, & y \neq a, \text{ wrong prediction} \end{cases},$$

wherein
 $r(\hat{s})$ is a reward that can be taken from state $\hat{s}$, a is an action predicted by policy $\pi$ for a given state, y is a label of a state, and $\omega y$ and $\omega a$ are weight coefficients based on $\omega_k = 1 - \log_b \varphi_k$ (b is e based on logarithm, 10 . . . ).

2. The system according to claim 1, wherein the weighted function unit operates to balance labels by increasing the weight value of the reward for a label having a frequency lower than a predetermined threshold and decreasing the weight of the reward for a label having a frequency higher than a predetermined threshold, wherein the label frequency is approximated as shown in the equation below $$\varphi_k = \dfrac{n_k}{\sum_{k=0}^{k-1} n_k},$$

wherein
 $n_k$ is the number of samples of the k-th label, and $\varphi_k$ is within a range of (0, 1), and the actor learns the policy to optimize the policy loss function by reflecting the predicted action and the weight value of the reward generated by the weighted function unit.

3. The system according to claim 1, wherein the weighted function unit operates to balance labels by increasing the weight value of the reward for a label having a frequency lower than a predetermined threshold and decreasing the weight of the reward for a label having a frequency higher than a predetermined threshold, and the actor learns the policy to optimize a policy loss function by reflecting the predicted action and the weight value of the reward generated by the weighted function unit, wherein learning the policy uses the equation shown below $$L_L = \begin{cases} -\mathbb{E}[[y \log \pi(\hat{s}) + (1-y)\log(1-\pi(\hat{s}))] * W(\hat{s}, a, y)], & \text{binomial} \\ -\mathbb{E}\left[\sum_{y=0,1\ldots} y^y \log \pi^y(\hat{s}) * W(\hat{s}, a, y)\right], & \text{categorial} \end{cases},$$

wherein $\hat{S}$ is a missing imputation value, y is a label of a state, a is an action predicted by policy $\pi$ for a given state, and W ($\hat{s}$, a, y) is a weight value of a reward for the state, action, and label.

4. A generative adversarial network-based classification method using a classification system based on a generative adversarial network (GAN), which is configured of a generator, a discriminator, an actor, and a weighted function unit, the method comprising the steps of:
 a) generating a missing imputation value for a missing part among states from a labeled dataset, by the generator;
 b) predicting an action through a policy with the missing imputation value generated by the generator, by the actor;

c) generating a weight value of a reward on the basis of a state replaced with the missing imputation value, the predicted action, and a label of the labeled dataset, by the weighted function unit; and d) learning the policy to optimize a policy loss function by reflecting the predicted action and the weight value of the reward generated by the weighted function unit, by the actor, wherein at step c), the weighted function unit operates to balance labels by increasing the weight value of the reward for a label having a frequency lower than a predetermined threshold and decreasing the weight of the reward for a label having a frequency higher than a predetermined threshold, wherein the weighted function unit of step c) operates to balance labels by increasing the weight value of the reward for a label having a frequency lower than a predetermined threshold and decreasing the weight of the reward for a label having a frequency higher than a predetermined threshold, wherein the label frequency is approximated as shown in the equation below $$\varphi_k = \frac{n_k}{\sum_{k=0}^{k-1} n_k},$$

wherein $n_k$ is the number of samples of the k-th label, and $\varphi_k$ is within a range of (0, 1), and the weight value of the reward is defined by the following equation $$W(\hat{s}, a, y) = r(\hat{s}) * \begin{cases} \omega_y, & y = a, \text{ right prediction} \\ \frac{\omega_y + \omega_a}{2}, & y \neq a, \text{ wrong prediction} \end{cases},$$

wherein $r(\hat{s})$ is a reward that can be taken from state $\hat{s}$, a is an action predicted by policy $\pi$ for a given state, y is a label of a state, and $\omega_y$ and $\omega_a$ are weight coefficients based on $\omega_k = 1 - \log_b \varphi_k$ (b is e based on logarithm, 10 . . . ).

5. The method according to claim 4, wherein step a) further includes:

i) a step of selecting a state having a missing value from the labeled dataset, and a missing indicator (m) indicating whether a state element corresponding to the state is missing, by the generator; and ii) a preprocessing step of generating a missing imputation value $\hat{s}$ using a missing imputation value $\tilde{s}$ obtained by replacing the state with random noise randomly selected from a uniform distribution between '0' and '1', and learning the generator and the discriminator using the generated missing imputation value $\hat{S}$.

6. The method according to claim 4, wherein the weighted function unit of step c) operates to balance labels by increasing the weight value of the reward for a label having a frequency lower than a predetermined threshold and decreasing the weight of the reward for a label having a frequency higher than a predetermined threshold.

7. A generative adversarial network-based classification method using a classification system based on a generative adversarial network (GAN), which is configured of a generator, a discriminator, an actor, and a weighted function unit, the method comprising the steps of:

a) generating a missing imputation value for a missing part among states from a labeled dataset, by the generator;

b) predicting an action through a policy with the missing imputation value generated by the generator, by the actor;

c) generating a weight value of a reward on the basis of a state replaced with the missing imputation value, the predicted action, and a label of the labeled dataset, by the weighted function unit; and d) learning the policy to optimize a policy loss function by reflecting the predicted action and the weight value of the reward generated by the weighted function unit, by the actor, wherein at step c), the weighted function unit operates to balance labels by increasing the weight value of the reward for a label having a frequency lower than a predetermined threshold and decreasing the weight of the reward for a label having a frequency higher than a predetermined threshold, wherein at step d), learning the policy is performed using the equation shown below $$L_L = \begin{cases} -\mathbb{E}[[y\log\pi(\hat{s}) + (1-y)\log(1-\pi(\hat{s}))] * W(\hat{s}, a, y)], & \text{binomial} \\ -\mathbb{E}\left[\sum_{y=0,1\ldots} y^y \log\pi^y(\hat{s}) * W(\hat{s}, a, y)\right], & \text{categorical} \end{cases},$$

wherein y is a label of a state, a is an action predicted by policy $\pi$ for a given state, and W ($\hat{s}$, a, y) is a weight value of a reward for the state, action, and label.

8. A classification system based on a generative adversarial network, the system comprising:

a generator for generating a missing imputation value for a missing part among states from a labeled dataset $S_L$ or an unlabeled dataset $S_U$;

a discriminator for discriminating the missing imputation value generated by the generator from original data;

an actor for predicting an action through a policy with the missing imputation value generated by the generator;

a weighted function unit for generating a weight value of a reward on the basis of a state replaced with the missing imputation value, the predicted action, and a label of the labeled dataset; and a reward unit for providing a reward so that the policy of the actor is learned targeting the labeled dataset and the unlabeled dataset, wherein the actor learns the policy to optimize a policy loss function by reflecting the predicted action and the weight value of the reward generated by the weighted function unit, and learns the policy to optimize a semi-supervised policy loss function on the basis of the predicted action and the reward of the reward unit, and the reward of the reward unit is defined as shown in the following equation $$r(\hat{s}_u, a) = \begin{cases} 1, & R(\hat{s}_L, a) \geq \varepsilon \\ 0, & \text{otherwise} \end{cases},$$

wherein $R(\hat{s}_L, a)$ is the probability of whether the labeled dataset ($\hat{S}$, a) pair output from the reward unit is a label of a labeled dataset with labels or a label generated by the actor, and ε∈[0, 1] is a threshold value considering whether a state-action pair is likely to be included in a labeled dataset.

9. A generative adversarial network-based classification method using a generative adversarial network (GAN) configured of a generator, a discriminator, an actor, a weighted function unit, and a reward unit, the method comprising the steps of:
- a) generating a missing imputation value for a missing part among states from a labeled dataset $S_L$, by the generator;
- b) predicting an action through a policy with the missing imputation value generated by the generator, by the actor;
- c) generating a weight value of a reward on the basis of a state replaced with the missing imputation value, the predicted action, and a label of the labeled dataset, by the weighted function unit; and
- d) learning the policy to optimize a policy loss function by reflecting the predicted action and the weight value of the reward generated by the weighted function unit, by the actor, wherein when there is an unlabeled dataset ($S_U$) at step a), the method further comprises the steps of:
- a-1) generating a missing imputation value $\hat{s}_U$ for a missing part among states from an unlabeled dataset $S_U$, by the generator;
- b-1) predicting an action through a policy with the generated missing imputation value $\hat{s}_U$, by the actor; and
- c-1) providing a reward so that the policy of the actor is learned targeting the labeled dataset and the unlabeled dataset, by the reward unit; and
- d-1) learning the policy to optimize a semi-supervised policy loss function on the basis of the predicted action and the reward of the reward unit, wherein the reward of the reward unit is defined as shown in the following equation $$r(\hat{s}_u, a) = \begin{cases} 1, & R(\hat{s}_L, a) \geq \varepsilon \\ 0, & \text{otherwise} \end{cases},$$

wherein $R(\hat{s}_L, a)$ is the probability of whether the labeled dataset (S, a) pair output from the reward unit is a label of a labeled dataset with labels or a label generated by the actor, and ε=[0, 1] is a threshold value considering whether a state-action pair is likely to be included in a labeled dataset.

* * * * *